United States Patent
Cho et al.

(10) Patent No.: US 9,767,360 B2
(45) Date of Patent: Sep. 19, 2017

(54) IMAGE PROCESSING METHOD AND ELECTRONIC DEVICE IMPLEMENTING THE SAME

(71) Applicant: Samsung Electronics Co., Ltd., Suwon-si, Gyeonggi-do (KR)

(72) Inventors: Ikhwan Cho, Suwon-si (KR); Jinhe Jung, Hwaseong-si (KR); Minkyung Hwang, Seoul (KR); Daekyu Shin, Suwon-si (KR); Kyusung Cho, Suwon-si (KR); Seongho Cho, Seoul (KR); Yongjoon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/717,266

(22) Filed: May 20, 2015

(65) Prior Publication Data

US 2015/0347847 A1 Dec. 3, 2015

(30) Foreign Application Priority Data

May 29, 2014 (KR) ........................ 10-2014-0065480

(51) Int. Cl.
*G06K 9/00* (2006.01)
*G06K 9/46* (2006.01)
*G06T 7/246* (2017.01)

(52) U.S. Cl.
CPC ....... *G06K 9/00624* (2013.01); *G06K 9/4604* (2013.01); *G06T 7/246* (2017.01); *G06T 2207/10016* (2013.01)

(58) Field of Classification Search
None
See application file for complete search history.

(56) References Cited

U.S. PATENT DOCUMENTS

| 7,764,808 B2 * | 7/2010 | Zhu ...................... G06K 9/3241 |
| | | 382/103 |
| 8,488,011 B2 * | 7/2013 | Blanchflower ...... H04N 21/254 |
| | | 348/211.3 |
| 2011/0164163 A1 * | 7/2011 | Bilbrey ................. G06F 1/1694 |
| | | 348/333.01 |
| 2012/0243732 A1 | 9/2012 | Swaminathan et al. |
| 2013/0106910 A1 | 5/2013 | Sacco |
| 2013/0127907 A1 | 5/2013 | Lee et al. |

(Continued)

FOREIGN PATENT DOCUMENTS

WO 2012040099 A1 3/2012

OTHER PUBLICATIONS

David M. Chen et al., "Streaming Mobile Augmented Reality on Mobile Phones", Mixed and Augmented Reality, Oct. 10, 2009.

*Primary Examiner* — Tsung-Yin Tsai
(74) *Attorney, Agent, or Firm* — Jefferson IP Law, LLP

(57) ABSTRACT

An image processing method and an electronic device implementing the method are provided. The method includes the electronic device sequentially receiving an image captured by a camera and determining whether a frame of the received image satisfies a predetermined condition. If the predetermined condition is satisfied, the electronic device recognizes an object in the frame. Then the electronic device tracks the object in the frame through tracking data created based on a feature extracted from the recognized object.

15 Claims, 11 Drawing Sheets

(56) References Cited

U.S. PATENT DOCUMENTS

| | | | |
|---|---|---|---|
| 2014/0210710 A1* | 7/2014 | Shin | G06T 11/60 345/156 |
| 2014/0225924 A1* | 8/2014 | Loxam | G06T 19/006 345/633 |
| 2014/0231501 A1* | 8/2014 | Mykhailenko | G06K 7/1456 235/375 |
| 2014/0233800 A1* | 8/2014 | Kis | G06T 7/246 382/103 |
| 2014/0233801 A1* | 8/2014 | Cho | G06T 7/20 382/103 |
| 2014/0267770 A1* | 9/2014 | Gervautz | H04N 5/23296 348/169 |
| 2015/0312649 A1* | 10/2015 | Gopalan | H04N 21/84 725/32 |

* cited by examiner

IMAGE PROCESSING METHOD AND ELECTRONIC DEVICE IMPLEMENTING THE SAME

CROSS-REFERENCE TO RELATED APPLICATION(S)

This application claims the benefit under 35 U.S.C. §119 (a) of a Korean patent application filed on May 29, 2014 in the Korean Intellectual Property Office and assigned Serial number 10-2014-0065480, the entire disclosure of which is hereby incorporated by reference.

TECHNICAL FIELD

The present disclosure relates to an image processing method and an electronic device implementing the same.

BACKGROUND

Currently, electronic devices have been developed in the form of a multimedia player which can perform a variety of functions, such as a digital camera, a music playback, a video play, a game, a broadcasting reception, a navigation service, and the like.

In order to realize various functions in such a multimedia player, new and various tries are now applied in view of hardware or software. One example is a user-friendly touch-based, gesture-based, and/or graphic-based user interface (UI).

Augmented reality (AR) is another example that attracts the attention from the market. AR is one of virtual reality and offers a live direct or indirect view of a physical, real-world environment whose elements are augmented or supplemented by computer-generated sensory input, such as sound, video, graphics or location data. AR has many applications. First used for military, industrial, and medical applications, it has also been applied to commercial, educational, and entertainment areas.

To create an image for AR may require the recognition of an interested object in a real-world image (e.g., individual things contained in an image captured by a camera). One example of recognizing an object is to transmit a captured image to a server at an electronic device, to recognize an object by comparing objects in the captured image with data stored in a recognition database at the server, and to return a recognition result to the electronic device.

This technique, however, requires much consumption of network bandwidth in case of transmitting continuous image frames, such as a preview image. Meanwhile, in case the electronic device directly performs the recognition of an object without using the server, the electronic device may bear a heavy burden of continuously processing image frames.

Therefore, a need exists for an image processing method and an electronic device implementing the same.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image processing method for obviating the above-discussed drawbacks and an electronic device for implementing the method.

In accordance with an aspect of the present disclosure, an image processing method is provided. The method includes sequentially receiving an image captured by a camera, determining whether a frame of the received image satisfies a certain condition, recognizing, if the certain condition is satisfied, an object in the frame, and tracking the object in the frame through tracking data created based on a feature extracted from the recognized object.

In accordance with another aspect of the present disclosure, an electronic device is provided. The device includes a sensor unit configured to measure a motion of an object, an input unit including a camera configured to capture an image of the object, a memory configured to store data about the motion of the object, a display module configured to display the image, a wireless communication unit configured to communicate with a server, and a processor configured to control the sensor unit, the input unit, the memory, the display module, and the wireless communication unit. In this electronic device, the processor may be further configured to sequentially receive the captured frame from the camera, to determine whether a frame of the received frame satisfies a certain condition, to recognize the object in the frame when the certain condition is satisfied, and to track the object in the frame through tracking data created based on a feature extracted from the recognized object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
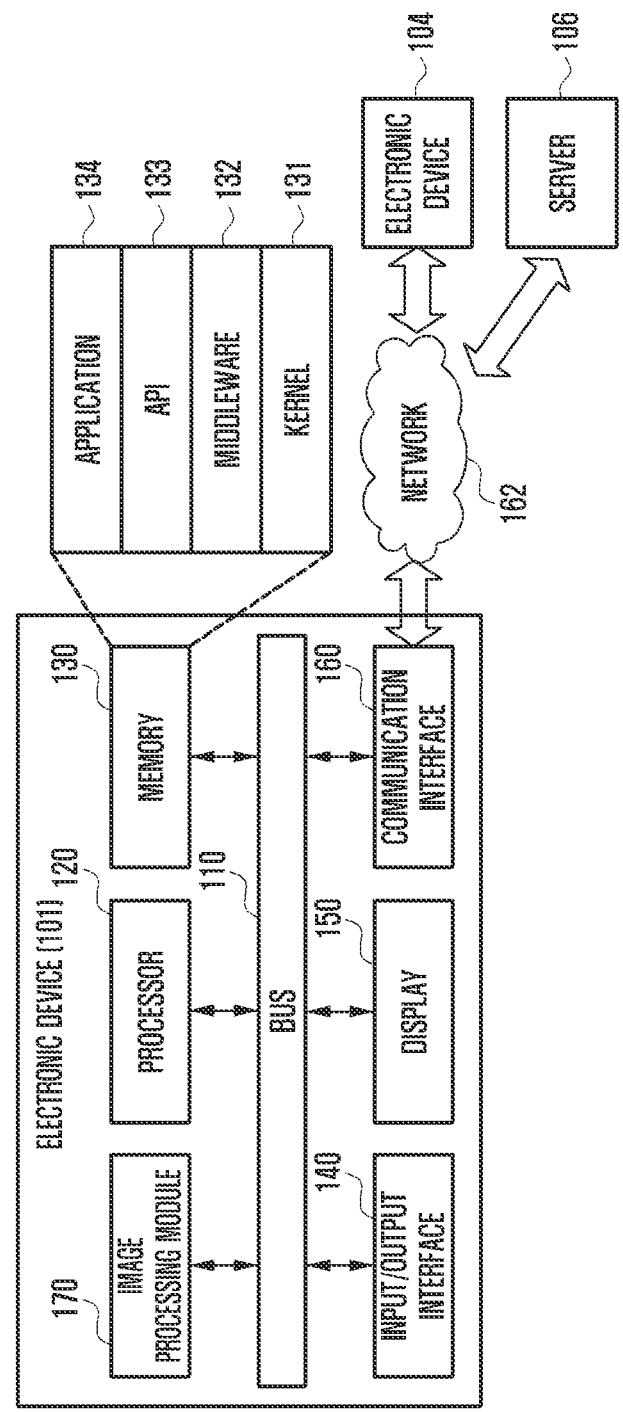
FIG. 1 is a block diagram illustrating a network environment including therein an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The expressions, such as "include" and "may include" which may be used in an embodiment of the present disclosure denote the presence of the disclosed functions, operations, and constituent elements and do not limit one or more additional functions, operations, and constituent elements. In an embodiment of the present disclosure, the terms, such as "include" and/or "have" may be construed to denote a certain characteristic, number, operation, constituent element, component or a combination thereof, but may not be construed to exclude the existence of or a possibility of the addition of one or more other characteristics, numbers, operations, constituent elements, components or combinations thereof.

In an embodiment of the present disclosure, the expression "and/or" includes any and all combinations of the associated listed words. For example, the expression "A and/or B" may include A, may include B, or may include both A and B.

In an embodiment of the present disclosure, expressions including ordinal numbers, such as "first" and "second," and the like, and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although for both of them the first user device and the second user device are user devices. For example, a first element could be termed a second element, and similarly, a second element could be also termed a first element without departing from the scope of the present disclosure.

In the case where according to which a component is referred to as being "connected" or "accessed" to other component, it should be understood that not only the component is directly connected or accessed to the other component, but also another component may exist between the component and the other component. Meanwhile, in the case where according to which a component is referred to as being "directly connected" or "directly accessed" to other component, it should be understood that there is no component therebetween.

The terms used in embodiments of the present disclosure are only used to describe specific various embodiments of the present disclosure, and are not intended to limit the present disclosure.

Unless otherwise defined, all terms including technical and/or scientific terms used herein have the same meaning as commonly understood by one of ordinary skill in the art to which the disclosure pertains. In addition, unless otherwise defined, all terms defined in generally used dictionaries may not be overly interpreted.

For example, the electronic device corresponds to a combination of at least one of the followings: a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player (e.g., a Moving Picture Experts Group (MPEG-1 or MPEG-2) Audio Layer 3 (MP3) player), a mobile medical device, a camera, or a wearable device. Examples of the wearable device are a head-mounted-device (HMD) (e.g., electronic eyeglasses), electronic clothing, an electronic bracelet, an electronic necklace, an appcessory, an electronic tattoo, a smart watch, and the like.

The electronic device according to the various embodiments of the present disclosure may be smart home appliances. Examples of the smart home appliances are a television (TV), a Digital Video Disc (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, or the like.

The electronic device according to the various embodiments of the present disclosure may include at least one of the following: medical devices (e.g., Magnetic Resonance Angiography (MRA), Magnetic Resonance Imaging (MRI), Computed Tomography (CT), a scanning machine, an ultrasonic scanning device, and the like), a navigation device, a Global Positioning System (GPS) receiver, an Event Data Recorder (EDR), a Flight Data Recorder (FDR), a vehicle infotainment device, an electronic equipment for ships (e.g., navigation equipment, gyrocompass, and the like), avionics, a security device, a head unit for vehicles, an industrial or home robot, an automatic teller's machine (ATM), a point of sales (POS) system, and the like.

The electronic device according to the various embodiments of the present disclosure may include at least one of the following: a furniture or a portion of a building/structure, an electronic board, an electronic signature receiving device, a projector, various measuring instruments (e.g., a water meter, an electric meter, a gas meter and a wave meter), and the like. The electronic device according to the various embodiments of the present disclosure may also include a combination of the devices listed above. In addition, the electronic device according to the various embodiments of the present disclosure may be a flexible device. It is obvious to those skilled in the art that the electronic device according to the various embodiments of the present disclosure is not limited to the aforementioned devices.

Hereinafter, an electronic device according to various embodiments will be described with reference to the accompanying drawings. The term 'user' to be used herein may refer to a person or machine (e.g., an artificial intelligence apparatus or system) using an electronic device.

FIG. 1 is a block diagram illustrating a network environment including therein an electronic device according to various embodiments of the present disclosure.

Referring to FIG. 1, an electronic device 101 may include a bus 110, a processor 120, a memory 130, an input/output interface 140, a display 150, a communication interface 160, and an image processing module 170.

The bus 110 may be a communication circuit that connects the components to each other and transfers data (e.g., control messages) between the components.

The processor 120 may receive instructions from the components (e.g., the memory 130, input/output interface 140, display 150, communication interface 160, display control module 170, and the like) via the bus 110, decode them and perform corresponding operations or data processing according to the decoded instructions.

The memory 130 may store instructions or data transferred from/created in the processor 120 or the other components (e.g., the input/output interface 140, display 150, communication interface 160, image processing module 170, and the like). The memory 130 may include programming modules, e.g., a kernel 131, middleware 132, an application programming interface (API) 133, an application module 134, and the like. Each of the programming modules may be software, firmware, hardware or a combination thereof.

The kernel 131 may control or manage system resources (e.g., the bus 110, processor 120, memory 130, and the like) used to execute operations or functions of the programming modules, e.g., the middleware 132, API 133, and application module 134. The kernel 131 may also provide an interface that can access and control/manage the components of the electronic device 101 via the middleware 132, API 133, and application module 134.

The middleware 132 may make it possible for the API 133 or application module 134 to perform data communication with the kernel 131. The middleware 132 may also perform control operations (e.g., scheduling, load balancing) for task requests transmitted from the application module 134 by methods, for example, a method for assigning the order of priority to use the system resources (e.g., the bus 110, processor 120, memory 130, and the like) of the electronic device 101 to at least one of the applications of the application module 134.

The API 133 is an interface that allows the application module 134 to control functions of the kernel 131 or middleware 132. For example, the API 133 may include at least one interface or function (e.g., an instruction) for file control, window control, character control, video process, and the like.

In various embodiments of the present disclosure, the application module 134 may include applications that are related to: Short Message Service (SMS)/Multimedia Messaging Service (MMS), email, calendar, alarm, health care (e.g., an application for measuring the blood sugar level, a workout application, and the like), environment information (e.g., atmospheric pressure, humidity, temperature, and the like), and the like. The application module 134 may be an application related to exchanging information between the electronic device 101 and the external electronic devices (e.g., another electronic device 104). The information exchange-related application may include a notification relay application for transmitting specific information to an external electronic device or a device management application for managing external electronic devices.

For example, the notification relay application may include a function for transmitting notification information, created by the other applications of the electronic device 101 (e.g., an SMS/MMS application, an email application, a health care application, an environment information application, and the like), to an external electronic device (e.g., the other electronic device 104). In addition, the notification relay application may receive notification information from an external electronic device (e.g., the other electronic device 104) and provide the notification information to the user. The device management application can manage (e.g., to install, delete, update, and the like): part of the functions of an external electronic device (e.g., the other electronic device 104) communicating with the electronic device 101, e.g., turning on/off the external electronic device, turning on/off part of the components of the external electronic device, adjusting the brightness (or the display resolution) of the display of the external electronic device, and the like, applications operated in the external electronic device, or services from the external electronic device, e.g., a call service, a messaging service, and the like.

In various embodiments of the present disclosure, the application module 134 may include applications designated according to attributes (e.g., a type of electronic device) of the external electronic device (e.g., the other electronic device 104). For example, if the external electronic device is an MP3 player, the application module 134 may include an application related to music playback. If the external electronic device is a mobile medical device, the application module 134 may include an application related to health care. In an embodiment of the present disclosure, the application module 134 may include at least one of the following: an application designated in the electronic device 101 and applications transmitted from external electronic devices (e.g., a server 106, the other electronic device 104, and the like).

The input/output interface 140 may receive instructions or data from the user via an input/output system (e.g., a sensor, a keyboard, a touch screen, and the like) and transfers them to the processor 120, memory 130, communication interface 160 or image processing module 170 through the bus 110. For example, the input/output interface 140 may provide data corresponding to a user's touch input to a touch screen to the processor 120. The input/output interface 140 may receive instructions or data from the processor 120, memory 130, communication interface 160 or image processing module 170 through the bus 110, and output them to an input/output system (e.g., a speaker, a display, and the like). For example, the input/output interface 140 may output voice data processed by the processor 120 to the speaker.

The display 150 may display various types of information (e.g., multimedia data or text data) to a user.

The communication interface 160 may communicate between the electronic device 101 and an external system (e.g., the other electronic device 104 or the server 106). For example, the communication interface 160 may connect to a network 162 in wireless or wired mode and communicate with the external system. Wireless communication may include at least one of the following: Wireless Fidelity (Wi-Fi), Bluetooth (BT), near field communication (NFC), GPS or cellular communication (e.g., long term evolution (LTE), LTE-Advanced (LTE-A), code division multiple access (CDMA), wideband CDMA (WCDMA), universal mobile telecommunications system (UMTS), wireless broadband (Wi-Bro), global system for mobile communications (GSM), and the like). Wired communication may include at least one of the following: universal serial bus (USB), high definition multimedia interface (HDMI), recommended standard 232 (RS-232), plain old telephone service (POTS), and the like.

In an embodiment of the present disclosure, the network 162 may be a telecommunication network. The telecommunication network may include at least one of the following: a computer network, Internet, Internet of things, telephone network, and the like. The protocol for communication between the electronic device 101 and the external system, e.g., a transport layer protocol, a data link layer protocol, or a physical layer protocol, may be supported by at least one of the following: application module 134, API 133, middleware 132, kernel 131 and communication module 160.

The image processing module 170 may process at least part of information obtained from other elements (e.g., the processor 120, the memory 130, the input/output interface 140, or the communication interface 160) and offer this to a user in various manners. For example, using or independently of the processor 120, the image processing module 170 may control at least part of functions of the electronic device 101 so that the electronic device 101 may interact with other electronic device (e.g., the other electronic device 104 or the server 106).

Figure 2:
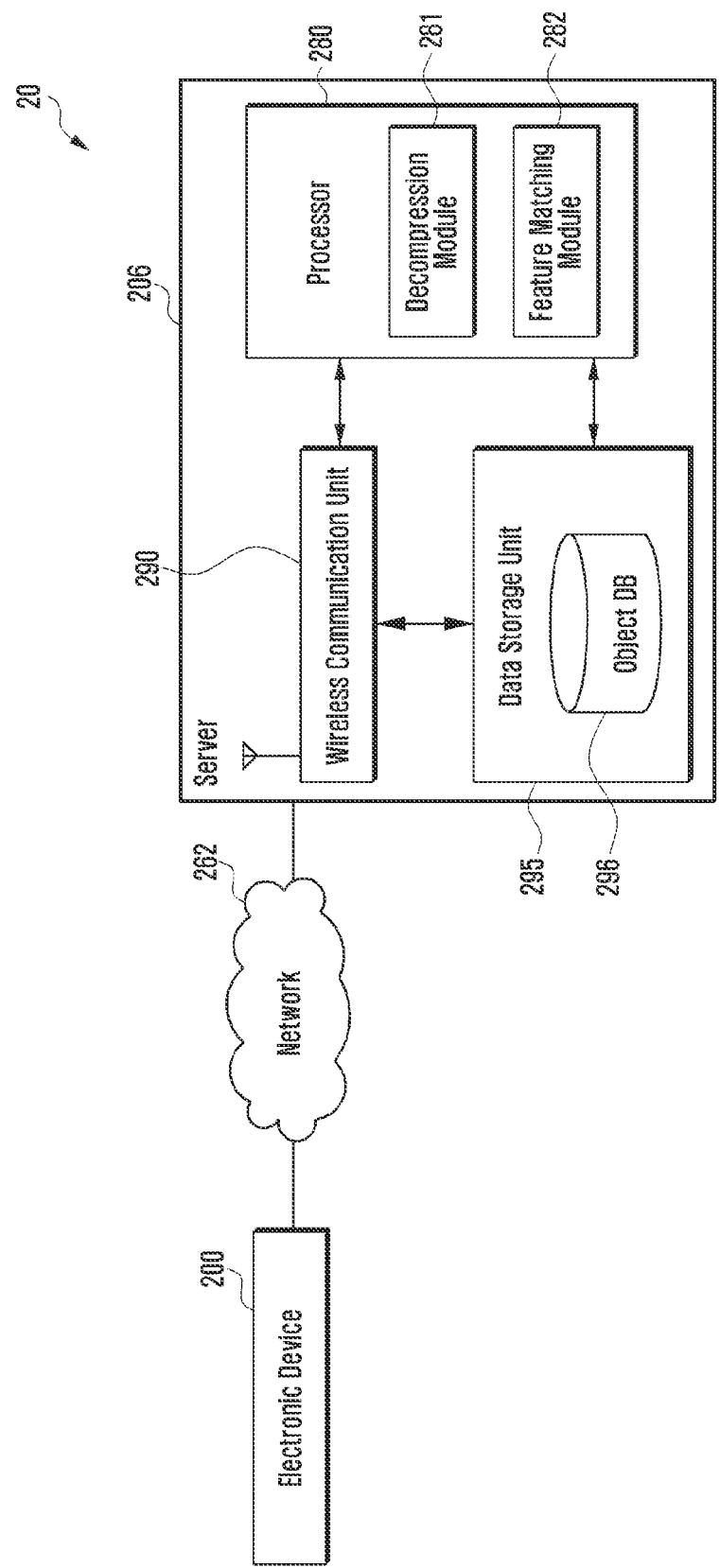
FIG. 2 is a block diagram illustrating an object recognition system using an electronic device according to various embodiments of the present disclosure.

FIG. 2 is a block diagram illustrating an object recognition system using an electronic device according to various embodiments of the present disclosure.

Referring to FIG. 2, additional information about a server 206 communicating with an electronic device 200 is offered. A system 20 may include the electronic device 200 (e.g., the electronic device 101 in FIG. 1), the server 206, and a network 262. The server 206 (e.g., the server 106 in FIG. 1) may include a processor 280, a wireless communication unit 290, and a data storage unit 295. The processor 280 may receive a command from the above-mentioned other elements (e.g., the wireless communication unit 290 and the data storage unit 295), decode the received command, and perform a calculation or data processing according to the decoded command. The processor 280 may include a decompression module 281 and a feature matching module 282.

Figure 4:
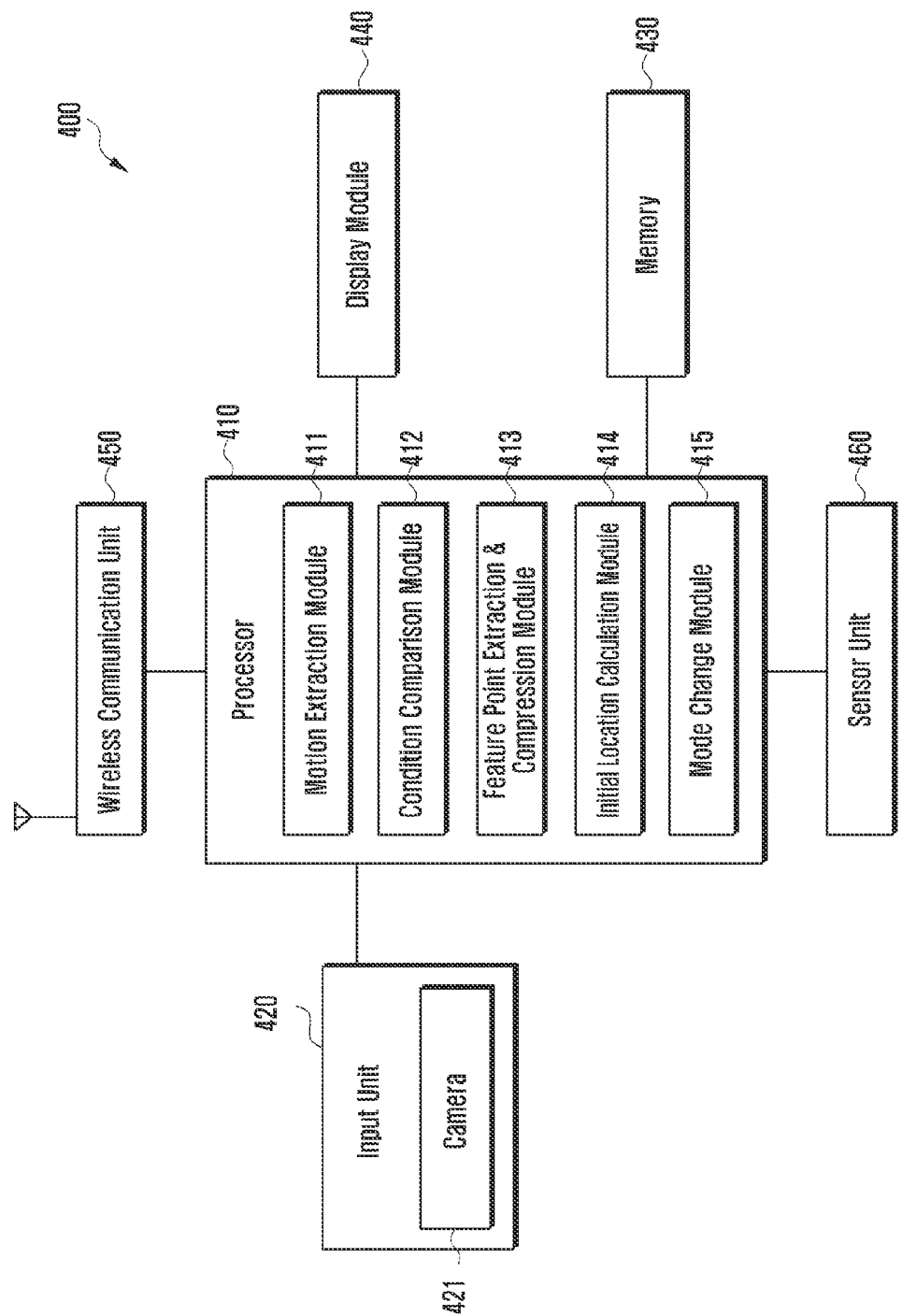

The decompression module 281 may decompress data received from a feature point extraction and compression module (e.g., a feature point extraction and compression module 413 in FIG. 4) in a processor (e.g., a processor 410 in FIG. 4) of the electronic device 200 through the wireless communication unit 290. The feature matching module 282 may compare feature data decompressed by the decompression module 281 with feature data stored in an object database 296 of the data storage unit 295. If there is the identical object as the result of comparison of features, the feature matching module 282 may transmit tracking data to the electronic device 200 through the wireless communication unit 290.

The term "module" according to the various embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific Integrated Circuit (ASIC) chip, Field-Programmable Gate Arrays (FPGAs), and Programmable-Logic Device known or to be developed for certain operations.

The wireless communication unit 290 may establish a wireless connection between electronic devices or between the server 206 and the electronic device 200. The wireless communication unit 290 may support a short-range communication protocol (e.g., WiFi, BT, NFC, and the like) or any other network communication (e.g., Internet, Local Area Network (LAN), Wide Area Network (WAN), telecommunication network, cellular network, satellite network, POTS, and the like).

The data storage unit 295 may include therein the object database (DB) 296.

The processor 280 of the server 206 may store feature data of objects in the object DB 296 of the data storage unit 295. Such data stored in the object DB 296 may be feature data decompressed through the decompression module 281 of the processor 280.

Further discussion about the image processing module 170 will be made with reference to FIGS. 3 to 10.

Figure 3:
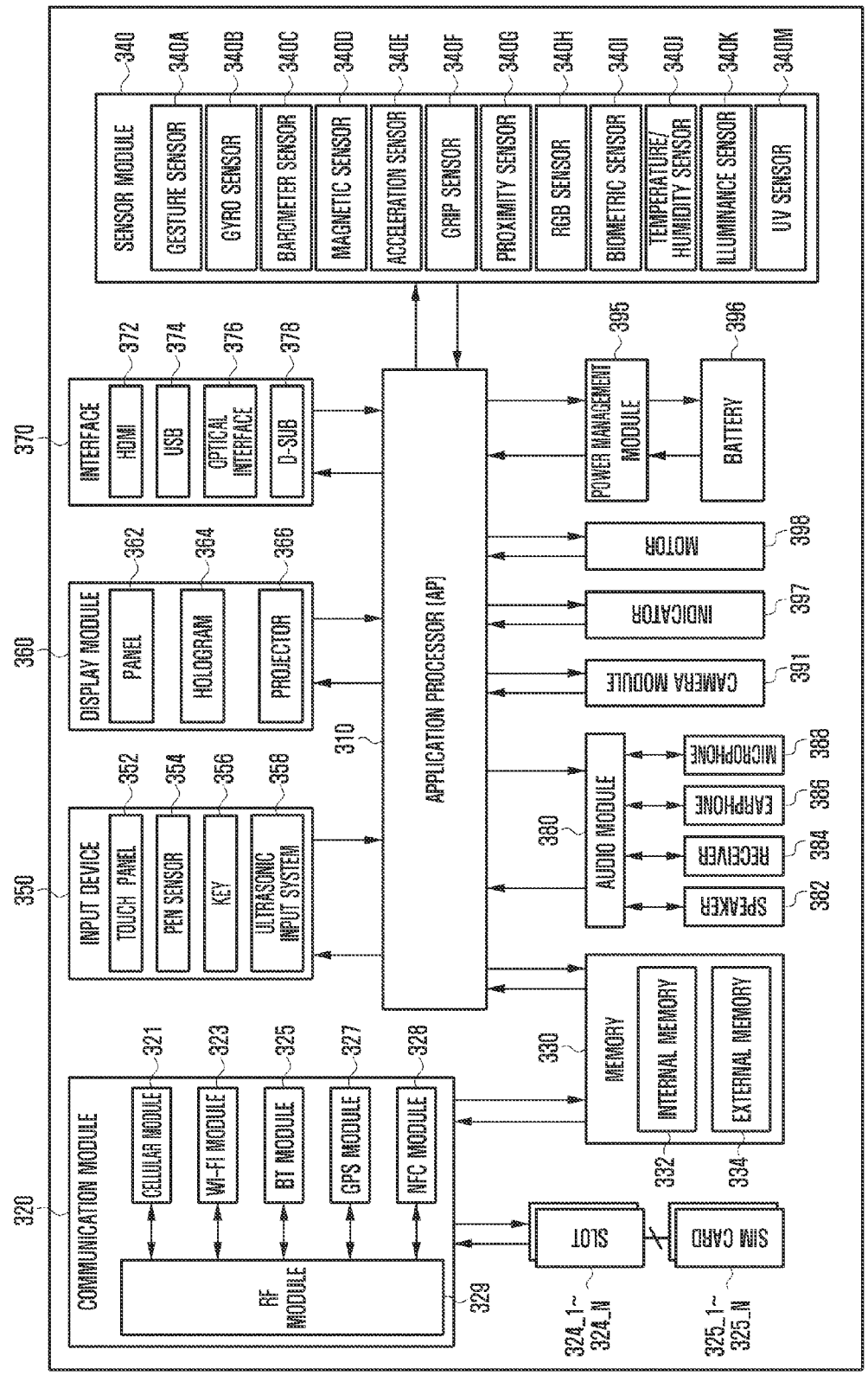
FIGS. 3 and 4 are block diagrams illustrating an electronic device according to various embodiments of the present disclosure.

FIG. 3 illustrates a schematic block diagram of an electronic device according to an embodiment of the present disclosure. The electronic device may be part or all of electronic device 101 as shown in FIG. 1.

Referring to FIG. 3, the electronic device may include one or more processors of an application processor (AP) 310, a communication module 320, subscriber identification module (SIM) cards 325_1-325_N, a memory 330, a sensor module 340, an input system 350, a display module 360, an interface 370, an audio module 380, a camera module 391, a power management module 395, a battery 396, an indicator 397, and a motor 398.

The AP 310 may control a number of hardware or software components connected thereto by executing the operation system or applications, process data including multimedia data, and perform corresponding operations. The AP 310 may be implemented with a system on chip (SoC). In an embodiment of the present disclosure, the AP 310 may further include a graphic processing unit (GPU).

The communication module 320 (e.g., the communication interface 160) performs communication for data transmission/reception between the other electronic devices (e.g., the other electronic device 104, the server 106, and the like) that are connected to the electronic device (e.g., electronic device 101) via the network. In an embodiment of the present disclosure, the communication module 320 may include a cellular module 321, a Wi-Fi module 323, a BT module 325, a GPS module 327, an NFC module 328 and a radio frequency (RF) module 329.

The cellular module 321 may provide voice call, video call, SMS or Internet service, and the like, via a communication network (e.g., LTE, LTE-A, CDMA, WCDMA, UMTS, Wi-Bro, GSM, and the like). The cellular module 321 may perform identification or authentication for electronic devices in a communication network by using their SIM (e.g., the SIM cards 325_1-325_N). In an embodiment of the present disclosure, the cellular module 321 may perform part of the functions of the AP 310. For example, the cellular module 321 may perform part of the functions for controlling multimedia.

In an embodiment of the present disclosure, the cellular module 321 may include a communication processor (CP). The cellular module 321 may be implemented with, for example, a SoC. Although the embodiment of the present disclosure shown in FIG. 3 is implemented in such a way that the cellular module 321 (e.g., a CP), the power management module 395, the memory 330, and the like, are separated from the AP 310, the embodiment of the present disclosure shown in FIG. 3 can be modified in such a way that the AP 310 includes at least part of those (e.g., the cellular module 321).

In an embodiment of the present disclosure, the AP 310 or the cellular module 321 (e.g., a CP) may load instructions or data transmitted from at least one of the following: non-volatile memory or other components, on a volatile memory and then process them. The AP 310 or the cellular module 321 may also store data in a non-volatile memory, which is transmitted from/created in at least one of the other components.

The Wi-Fi module 323, the BT module 325, the GPS module 327 and the NFC module 328 may include processors for processing transmission/reception of data, respectively. Although the embodiment of the present disclosure shown in FIG. 3 is implemented in such a way that the cellular module 321, Wi-Fi module 323, BT module 325, GPS module 327, and NFC module 328 are separated from each other, the embodiment of the present disclosure shown in FIG. 3 can be modified in such a way that part of those (e.g., two or more) are included in an integrated chip (IC) or an IC package. For example, part of the processors corresponding to the cellular module 321, Wi-Fi module 323, BT module 325, GPS module 327, and NFC module 328, e.g., a CP corresponding to the cellular module 321 and a Wi-Fi processor corresponding to the Wi-Fi 323, may be implemented with a SoC.

The RF module 329 may transmit or receive data, e.g., RF signals. The RF module 329 may include a transceiver, a power amplifier module (PAM), a frequency filter, a low noise amplifier (LNA), and the like. The RF module 329 may also include parts for transmitting/receiving electromagnetic waves, e.g., conductors, wires, and the like, via free space during wireless communication. Although the embodiment of the present disclosure shown in FIG. 3 is implemented in such a way that the cellular module 321, Wi-Fi module 323, BT module 325, GPS module 327, and NFC module 328 share the RF module 329, the embodiment of the present disclosure shown in FIG. 3 can be modified in such a way that at least one of those transmits or receives RF signals via a separate RF module.

The SIM cards 325_1-325_N may be a card with a SIM. The SIM cards 325_1-325_N may be fitted into a slot 324_1-324_N of the electronic device. The SIM cards 325_1-325_N may include unique identification information, e.g., an integrated circuit card identifier (ICCID), or subscriber information, e.g., an international mobile subscriber identity (IMSI).

The memory 330 (e.g., the memory 130) may include a built-in memory 332 and/or an external memory 334. The built-in memory 332 may include at least one of the following: volatile memory, e.g., a dynamic random access memory (DRAM), static RAM (SRAM), synchronous dynamic RAM (SDRAM), and the like, non-volatile memory, e.g., a one-time programmable read-only memory (OTPROM), programmable ROM (PROM), erasable and programmable ROM (EPROM), electrically erasable and programmable ROM (EEPROM), mask ROM, flash ROM, not and (NAND) flash memory, not or (NOR) flash memory, and the like.

In an embodiment of the present disclosure, the built-in memory 332 may be a Sold State Drive (SSD). The external memory 334 may further include a flash drive, e.g., compact flash (CF), secure digital (SD), micro-SD, mini-SD, extreme digital (XD), a memory stick, and the like. The external memory 334 may be functionally connected to the electronic device via various types of interface. In an embodiment of the present disclosure, the electronic device 101 may further include storage devices (or storage media), such as hard drives.

The sensor module 340 may measure physical quantity or detect operation states of the electronic device 101 and convert the measured or detected data to electrical signals. The sensor module 340 may include at least one of the following: gesture sensor 340A, gyro sensor 340B, atmospheric pressure sensor 340C, magnetic sensor 340D, acceleration sensor 340E, grip sensor 340F, proximity sensor 340G, color sensor 340H (e.g., red-green-blue (RGB) sensor), biosensor 340I, temperature/humidity sensor 340J, luminance sensor 340K, and ultra-violet (UV) sensor 340M.

The input system 350 may include a touch panel 352, a pen sensor 354 (i.e., a digital pen sensor), a key 356, and an ultrasonic input system 358. The touch panel 352 may detect touches in at least one of the following: capacitive detecting mode, pressure detecting mode, infrared detecting mode, and ultrasonic detecting mode. The touch panel 352 may further include a control circuit. When the touch panel 352 is designed to operate in capacitive detecting mode, the touch panel 352 can detect mechanical/physical touches or proximity of an object. The touch panel 352 may further include a tactile layer. In that case, the touch panel 352 can provide tactile feedback to the user.

The pen sensor 354 (i.e., a digital pen sensor) may be implemented in the same or similar way as receiving a user's touch input or by using a separate recognition sheet. The key 356 may include mechanical buttons, optical keys or a key pad. The ultrasonic input system 358 is a device that can detect sounds via a microphone 388 of the electronic device 101 by using an input tool for generating ultrasonic signals and can determine the data. The ultrasonic input system 358 can detect signals in wireless mode. In an embodiment of the present disclosure, the electronic device 101 may receive a user's inputs from an external system (e.g., a computer or server) via the communication module 320.

The display 360 (e.g., the display 150) may include a panel 362, a hologram unit 364, or a projector 366. The panel 362 may be implemented with a Liquid Crystal Display (LCD), Active Matrix Organic Light Emitting Diodes (AMOLEDs), or the like. The panel 362 may be implemented in a flexible, transparent, or wearable form. The panel 362 may form a single module with the touch panel 352. The hologram unit 364 shows a three-dimensional image in the air using interference of light. The projector 366 may display images by projecting light on a screen. The screen may be placed, for example, inside or outside the electronic device 101. In an embodiment of the present disclosure, the display module 360 may further include a control circuit for controlling the panel 362, the hologram unit 364, or the projector 366.

The interface 370 may include an HDMI 372, a USB 374, an optical interface 376, a D-subminiature (D-sub) 378, and the like. The interface 370 may also be included in the communication interface 160 shown in FIG. 1. The interface 370 may also include a mobile high-media card (MHL) interface, a SD card, a multi-media card (MMC) interface, an infrared data association (IrDA) standard interface, or the like.

The audio module 380 may make conversion between audios and electrical signals. At least part of the components in the audio module 380 may be included in the input/output interface 140 shown in FIG. 1. The audio module 380 may process audios output from/input to, for example, a speaker 382, a receiver 384, earphones 386, a microphone 388, and the like.

The camera module 391 may take still images or moving images. In an embodiment of the present disclosure, the camera module 391 may include one or more image sensors (e.g., on the front side and/or the back side), a lens, an image signal processor (ISP), a flash (e.g., an LED or a xenon lamp), or the like.

The power management module 395 may manage electric power supplying to the electronic device 101. The power management module 395 may include a power management integrated circuit (PMIC), a charger IC, a battery or fuel gauge, and the like.

The PMIC may be implemented in the form of IC chip or SoC. Charging electric power may be performed in wired or wireless mode. The charger IC may charge a battery, preventing input over-voltage or input over-current from inputting to the battery from a charger. In an embodiment of the present disclosure, the charger IC may be implemented with a wired charging type and/or a wireless charging type. Examples of the wireless charging type of charger IC are a magnetic resonance type, a magnetic induction type, an electromagnetic type, and the like. If the charger IC is implemented with a wireless charging type, the charger IC may include an additional circuit for wireless charging, e.g., a coil loop, a resonance circuit, a rectifier, and the like.

The battery gauge may measure the residual amount of battery 396, the level of voltage, the level of current, temperature during the charge. The battery 396 charges electric power and supplies the electric power to the electronic device 101. The battery 396 may include a rechargeable battery or a solar battery.

The indicator 397 shows states of the electronic device 101 or of the parts (e.g., the AP 310), e.g., a booting state, a message state, a recharging state, and the like. The motor 398 converts an electrical signal into a mechanical vibration. Although it is not shown, the electronic device 101 may include a processor for supporting a mobile TV, e.g., a GPU. The mobile TV supporting processor may process media data that comply with standards of digital multimedia broadcasting (DMB), digital video broadcasting (DVB), media flow, and the like.

Each of the elements/units of the electronic device according to an embodiment of the present disclosure may be implemented with one or more components, and be called different names according to types of electronic devices. The electronic device according to an embodiment of the present disclosure may include at least one element described above. The electronic device may be modified in such a way as to: remove part of the elements or include new elements. In addition, the electronic device according to an embodiment of the present disclosure may also be modified in such a way that parts of the elements are integrated into one entity that performs their original functions.

FIG. 4 is a block diagram illustrating an electronic device according to various embodiments of the present disclosure.

Referring to FIG. 4, the processor 410 may perform a function of the image processing module 170 shown in FIG. 1. The processor 410 may selectively operate in a recognition mode and in a tracking mode. According to various embodiments of this disclosure, the recognition mode may be activated by driving a motion extraction module 411, a condition comparison module 412, and the feature point extraction and compression module 413. In addition, the tracking mode may be activated by driving an initial location calculation module 414 and a mode change module 415.

According to various embodiments of the present disclosure, the motion extraction module 411 may measure a motion of an object through suitable sensors. Specifically, using an acceleration sensor, a gyro sensor, a geomagnetic sensor, and the like, in a sensor unit 460, the motion extraction module 411 may identify what kind of motion occurs at an electronic device 400 and thereby measure a relative motion of an object. Additionally, the motion extraction module 411 may directly measure a motion of an object, based on the analysis of image. This image analysis based measurement may be performed in various manners for finding variations in previous and current images.

For example, a phase correlation calculation, an optical flow calculation, a normalized cross correlation, and the like may be used as the image analysis based measurement. In case of calculation using the image analysis, the motion extraction module 411 may perform a calculation for the entire image or for a partial image containing an object. Additionally, in case two or more interested objects are contained in a single image, the motion extraction module 411 may individually perform calculations for partial images corresponding to respective objects. In various embodiments of the present disclosure, the processor 410 may store extracted data in a memory 430 in the order of time. In addition, data stored in the memory 430 may be removed after an elapse of given time.

According to various embodiments of the present disclosure, when the motion extraction module 411 measures a sensor value of the electronic device 400 or an image variation value in obtained images, the condition comparison module 412 may determine whether at least one of such values satisfies a predetermined condition. If the predetermined condition is satisfied, the condition comparison module 412 may determine whether to transmit a specific image at that time (e.g., a frame) to the server 106.

According to various embodiments of the present disclosure, a predetermined condition applied to a sensor value may be defined as a state when a motion of the electronic device 400 is reduced remarkably for a close observation of an object while such a motion for finding the object is detected from one or more frames or at least part of sampled frames. Additionally, a predetermined condition applied to an image variation value may be defined as a state when an image variation is reduced remarkably for a close observation of an object while such a variation is measured in a certain degree from some frames.

According to various embodiments of the present disclosure, when the condition comparison module 412 determines that a predetermined condition is satisfied, the feature point extraction and compression module 413 may perform an image filtering at that time, perform a discrete process for image information, and detect at least one feature point. The feature point extraction and compression module 413 may describe the detected feature point information as a descriptor.

The descriptor may refer to information extracted from regions around a feature point allowing a matching even in variations of illumination or visual point. In order to find a distinguishable location from surroundings, the feature point extraction and compression module 413 may perform a suitable algorithm, such as Factor analysis system (FAST), Laplacian of Gaussian, Difference of Gaussian, Hessian, or the like. According to various embodiments of the present disclosure, feature point data described as the descriptor may be compressed by the feature point extraction and compression module 413. The processor 410 may control a wireless communication unit 450 to transmit the compressed feature point data to the server. In this case, it is possible to reduce packet transmission on the network with reduced bandwidth.

According to various embodiments of the present disclosure, the initial location calculation module 414 may calculate an object posture at a time point (e.g., a current frame) of starting to track an object through tracking data received from the server 206 or created at the electronic device 400.

The mode change module 415 may convert the recognition mode to the tracking mode and then track an object if the initial location calculation module 414 calculates an object posture. The mode change module 415 may not convert to the recognition mode until a failure in object tracking. In case of failing to track an object, the mode change module 415 may convert again to the recognition mode.

An input unit 420 may be the input device 350 shown in FIG. 3. The input unit 420 may include a camera 421, which may be a camera module 291 shown in FIG. 2. The camera 421 which is a device capable of capturing an image or recording a video may include, in an embodiment of the present disclosure, at least one of an image sensor (not shown), an ISP (not shown), and a flash LED (not shown). The camera 421 may be used for an image capture, a video recording, or a video call. An image captured by the camera 421 may be inputted to the motion extraction module 411. Then the motion extraction module 411 may measure a motion of the electronic device 400 in the received image. In addition, the motion extraction module 411 may measure a motion of the electronic device 400 using a sensor value extracted through eye tracking, a depth sensor, or the like.

The memory 430 may be the memory 330 shown in FIG. 3. The memory 430 may store data inputted from an image or video of an object received from the input unit 420.

A display module 440 may be the display module 360 shown in FIG. 3. The display module 440 may display thereon information processed at the electronic device 400. For example, the display module 440 may output an object image obtained by the camera 421 or received from the server.

According to various embodiments of the present disclosure, two or more display modules may be used depending on types of the electronic device 400.

The wireless communication unit 450 may be the communication module 320 shown in FIG. 3. The wireless communication unit 450 may establish a wireless connection between electronic devices or between the server and the electronic device. The sensor unit 460 may be the sensor module 340 shown in FIG. 3.

According to various embodiments of this disclosure, the electronic device 400 may include the sensor unit 460 configured to measure a motion of an object, the input unit 420 including the camera 421 configured to capture an image of the object, the memory 430 configured to store data about the motion of the object, the display module 440 configured to display the image, the wireless communication unit 450 configured to communicate with the server 206, and the processor 410 configured to control the sensor unit 460, the input unit 420, the memory 430, the display module 440, and the wireless communication unit 450. More particularly, the processor 410 may be further configured to sequentially receive the captured frame from the camera 421, to determine whether a frame of the received frame satisfies a predetermined condition, to recognize the object in the frame when the predetermined condition is satisfied, and to track the object in the frame through tracking data created using a feature extracted from the recognized object.

According to an embodiment of the present disclosure, the processor 410 may be further configured to measure, using the sensor unit 460, sensor values of a current frame and one or more previous frames before the current frame, and to determine whether the measured sensor values satisfy the predetermined condition. Here, the predetermined condition may be defined as a state when the sensor value greater than a critical value in the previous frames becomes less than the critical value in the current frame.

According to an embodiment of the present disclosure, the processor 410 may be further configured to measure image variation values between a current frame and an adjacent frame and between previous frames before the current frame, and to determine whether the image variation values satisfy the predetermined condition. Here, the predetermined condition may be defined as a state when the image variation value greater than a critical value in the previous frames becomes less than the critical value in the current frame and the adjacent frame.

According to an embodiment of the present disclosure, the processor 410 may be further configured to determine whether the frame satisfies the predetermined condition, and if the predetermined condition is satisfied, to further determine whether the same object exists to a specific extent or more in each frame.

According to an embodiment of the present disclosure, the processor 410 may be further configured to extract the feature of the object, to transmit the extracted feature to the server through the wireless communication unit, to receive the tracking data from the server through the wireless communication unit, and to track the object in the frame using the tracking data.

According to an embodiment of the present disclosure, the processor 410 may be further configured to determine, after extracting the feature of the object, whether a density value of the extracted feature is greater than a critical value. Here, the extracted feature may be transmitted to the server when the density value is greater than the critical value.

According to an embodiment of the present disclosure, the processor 410 may be further configured to track the object after calculating at least one of an initial location of the object and a posture of the object.

According to an embodiment of the present disclosure, the processor 410 may be further configured to set the synchronous trackable number of the objects, and to compare the number of the recognized objects with the synchronous trackable number. If the number of the recognized objects is less than the synchronous trackable number, a recognition mode may be performed to further recognize other objects together with a tracking mode for tracking the recognized objects until the objects are recognized up to the synchronous trackable number.

Now, the terms, a frame, a sensor, and an image variation value, will be described. A frame refers to each of still images that constitute a moving image. While a certain moving image is outputted, each frame may be displayed on the display module instantaneously and then shortly changed to the next frame. At this time, an afterimage effect causes an image to be seen as if moved. In this disclosure, the current frame will be referred to as an N frame, and the F-th previous frame from the current frame will be referred to as an N-F frame. Similarly, a frame just before the N frame will be referred to an N-1 frame. Meanwhile, a sensor may be used to detect a motion of the electronic device 400. The sensor may include an angular velocity sensor, an acceleration sensor, and the like. An image variation value may be calculated through analysis of adjacent frames. Namely, a variation in movement between images may be measured. According to an embodiment of the present disclosure, an image variation value may be used when an object only is moved without a motion of the electronic device 400 and thereby when it is difficult to recognize an object through a sensor value only.

The term, a condition, used in FIGS. 5 to 10 refers to one of predetermined conditions and may be classified into the first condition, the second condition, and the like. In this case, the content of each condition may be different from the others.

Similarly, the term, a critical value, refers to one of predetermined critical values and may be classified into the first critical value, the second critical value, and the like. In this case, each critical value may be different from the others.

Figure 5:
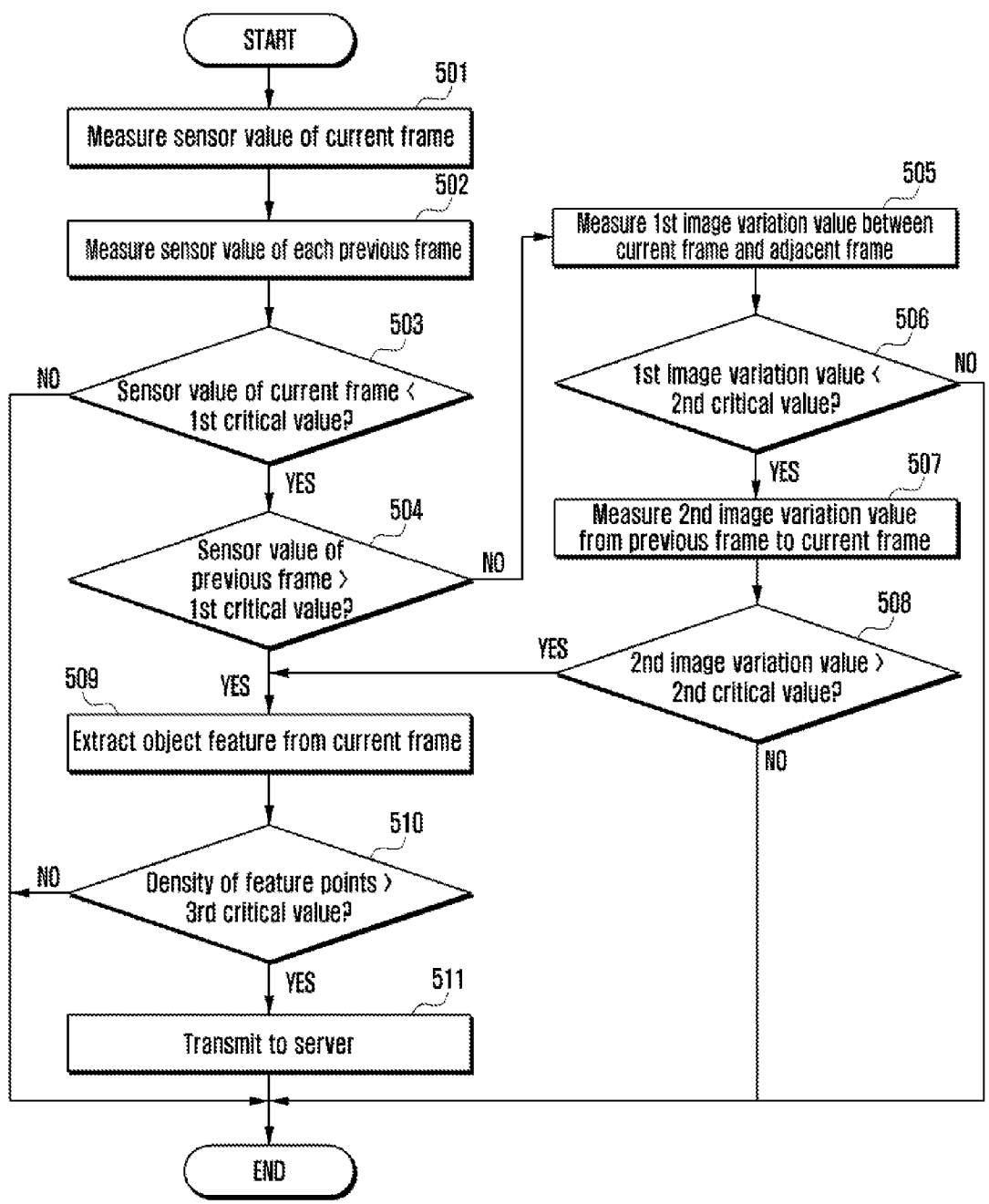
FIG. 5 is a flowchart illustrating a method for recognizing an object by detecting motions of both an electronic device and the object according to an embodiment of the present disclosure.

FIG. 5 is a flowchart illustrating a method for recognizing an object by detecting motions of both an electronic device and the object according to an embodiment of the present disclosure.

Referring to FIG. 5, at operation 501, the motion extraction module 411 may measure a sensor value of a current frame (N). In addition, at operation 502, the motion extraction module 411 may measure a sensor value of at least one frame before the current frame (N). At this time, the motion extraction module 411 may obtain a single sensor value (hereinafter, referred to as a sampling value or an average value) by sampling the measured sensor values from a specific previous frame (N-F) to the current frame (N) or calculating an average value thereof.

At operation 503, the condition comparison module 412 may compare the measured sensor value of the current frame (N) with the first critical value. The first critical value may indicate a specific sensor value measured at a state when a motion of the electronic device is reduced remarkably for a close observation of an object during a motion for finding the object. If the measured sensor value of the current frame (N) is not less than the first critical value at operation 503, the condition comparison module 412 may terminate this process. Otherwise, if the measured sensor value of the current frame (N) is less than the first critical value at operation 503, the condition comparison module 412 may perform operation 504. Here, the sensor value less than the first critical value may mean no motion.

At operation 504, the condition comparison module 412 may compare the sampling value or the average value with the first critical value. If the sampling value or the average value is greater than the first critical value, operation 509 will be performed. Otherwise, if the sampling value or the average value is less than the first critical value, operation 505 will be performed.

At operation 505, the motion extraction module 411 may measure the first image variation value between the current frame (N) and the adjacent frame (N-1).

Additionally, at operation 506, the condition comparison module 412 may compare the first image variation value with the second critical value. If the first image variation value is greater than the second critical value, the process may be terminated. Otherwise, if the first image variation value is less than the second critical value, operation 507 will be performed.

At operation 507, the motion extraction module 411 may measure image variation values between respective adjacent frames from a specific previous frame (N-F) to the current frame (N) and then obtain the second image variation value by sampling the measured image variation values or calculating an average value thereof.

At operation 508, the condition comparison module 412 may compare the second image variation value with the second critical value. If the second image variation value is less than the second critical value, the process may be terminated. Otherwise, if the second image variation value is greater than the second critical value, operation 509 will be performed.

At operation 509, the feature point extraction and compression module 413 may extract an object feature from the current frame (N). Thereafter, at operation 510, the processor 410 may compare a density of extracted feature points with the third critical value. If a density value of feature points is less than the third critical value, the process may be terminated. Otherwise, if a density value of feature points is greater than the third critical value, operation 511 will be performed. In some embodiments of the present disclosure, this operation 510 may be skipped depending on a user's intention or circumstance. At operation 511, the feature point extraction and compression module 413 may compress the extracted feature data. Then the processor 410 may transmit the extracted or compressed feature data to the server 206 by controlling the wireless communication unit 450.

As discussed above, the processor 410 may determine whether predetermined conditions are satisfied using some critical values. The above-discussed process is exemplary only and not to be considered as a limitation of the present disclosure. Alternatively or additionally, other processes may be possible, which will be described hereinafter with reference to FIGS. 6 and 7.

Figure 6:
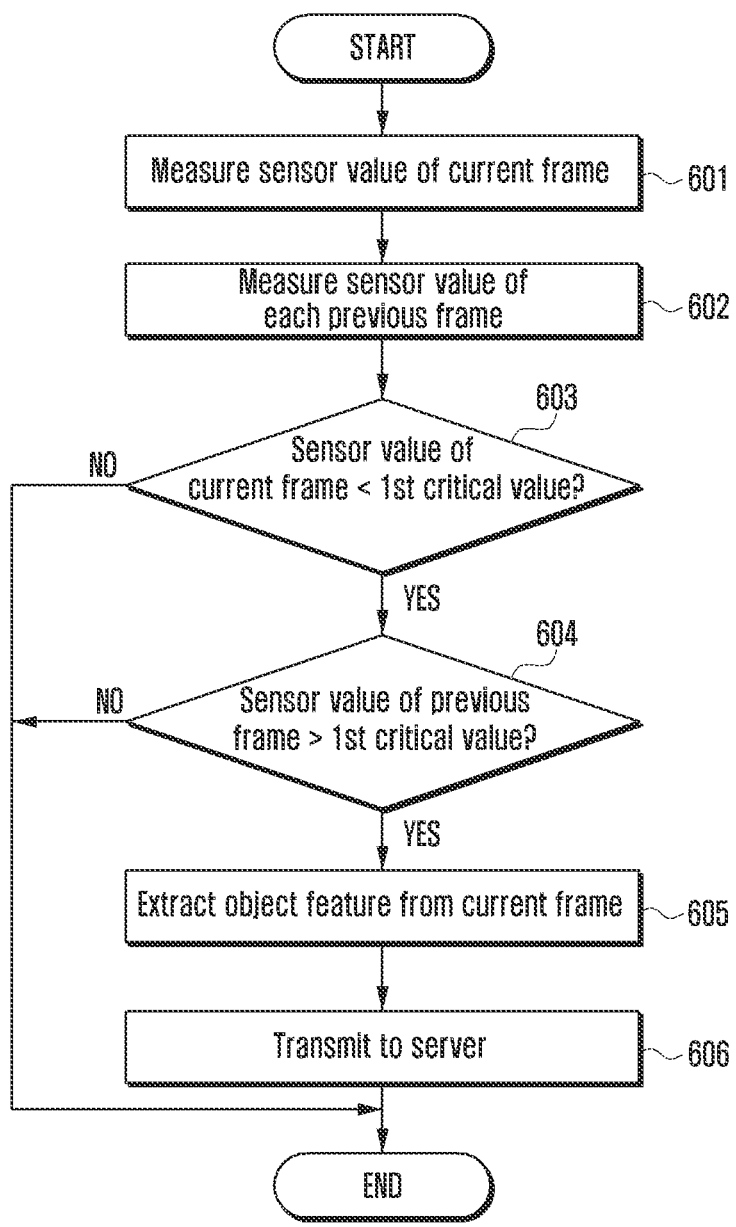
FIG. 6 is a flowchart illustrating a method for recognizing an object by detecting a motion of an electronic device according to an embodiment of the present disclosure.

FIG. 6 is a flowchart illustrating a method for recognizing an object by detecting a motion of an electronic device according to an embodiment of the present disclosure.

Referring to FIG. 6, operations 601 to 606 correspond to the above-discussed operations 501 to 504, 509 and 511 in FIG. 5, respectively. FIG. 6 shows a process of recognizing an object by measuring a motion of the electronic device with a sensor when the object remains stationary and the electronic device is moved.

At operation 601, the motion extraction module 411 may measure a motion of the electronic device in a current frame (N) by controlling the sensor unit 260. In addition, at operation 602, the motion extraction module 411 may measure a motion of the electronic device in each frame of at least one previous frame (N-F) before the current frame (N) by using the sensor unit 260. Measured results at operations 601 and 602 are obtained as sensor values. At this time, the motion extraction module 411 may obtain a single sensor value (hereinafter, referred to as a sampling value or an average value) by sampling the sensor values from a specific previous frame (N-F) to the current frame (N) or calculating an average value thereof.

At operation 603, the condition comparison module 412 may compare the measured sensor value of the current frame (N) with the first critical value. The first critical value may indicate a specific sensor value measured at a state when a motion of the electronic device is reduced remarkably for a close observation of an object during a motion for finding the object. If the measured sensor value of the current frame (N) is not less than the first critical value at operation 603, the condition comparison module 412 may terminate this process. Otherwise, if the measured sensor value of the current frame (N) is less than the first critical value at operation 603, the condition comparison module 412 may perform operation 604.

At operation 604, the condition comparison module 412 may compare the sampling value or the average value with the first critical value. If the sampling value or the average value is less than the first critical value, the process may be terminated. Otherwise, if the sampling value or the average value is greater than the first critical value, operation 605 will be performed.

At operation 605, the feature point extraction and compression module 413 may extract an object feature from the current frame (N). Thereafter, at operation 606, the feature point extraction and compression module 413 may compress the extracted feature data. At this time, the processor 410 may transmit the extracted or compressed feature data to the server 206 by controlling the wireless communication unit 450.

Figure 7:
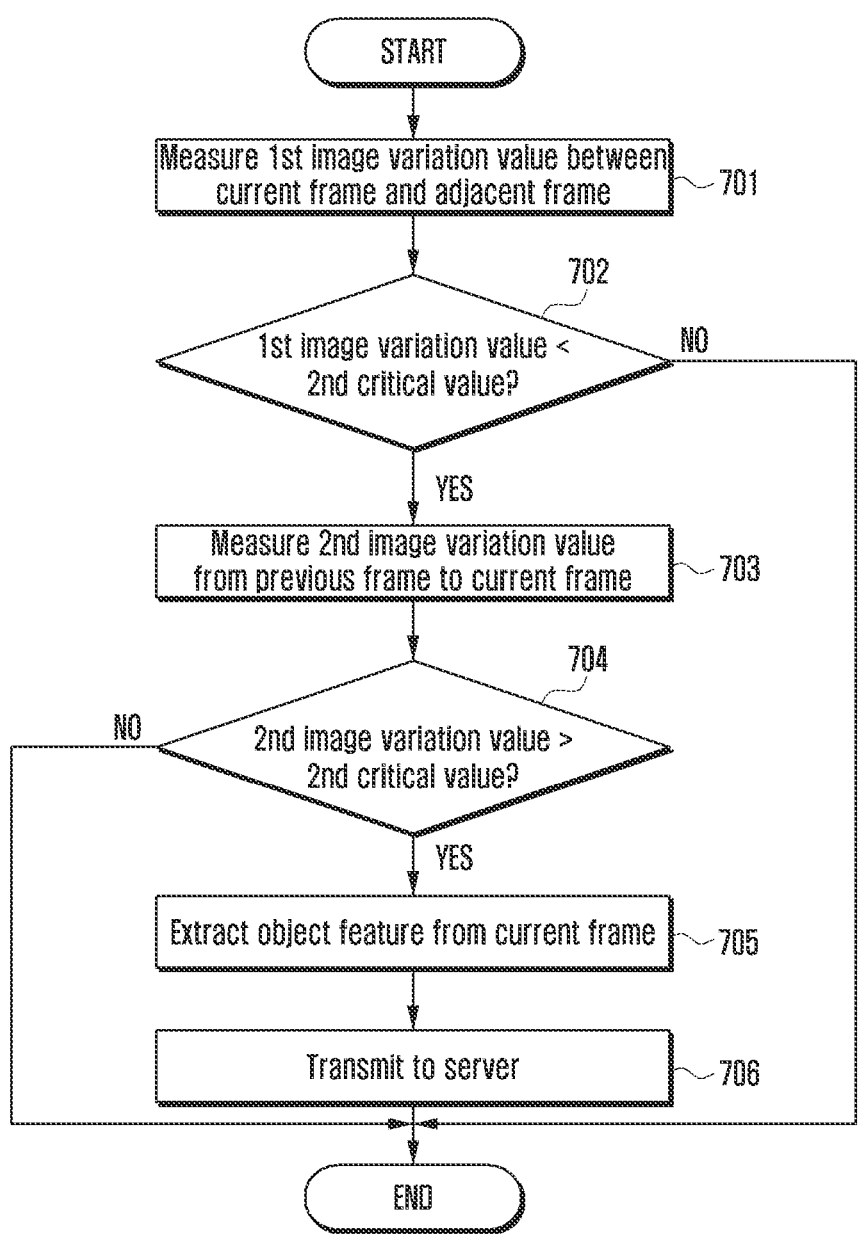
FIG. 7 is a flowchart illustrating a method for recognizing an object by detecting a motion of the object according to an embodiment of the present disclosure.

FIG. 7 is a flowchart illustrating a method for recognizing an object by detecting a motion of the object according to an embodiment of the present disclosure.

Referring to FIG. 7, a process of recognizing an object when the object is moved and the electronic device remains stationary is illustrated. In this case, a motion of the object may be measured from a variation in images between adjacent frames without using a sensor value.

At operation 701, the motion extraction module 411 may measure the first image variation value between the current frame (N) and the adjacent frame (N-1). Additionally, at operation 702, the condition comparison module 412 may compare the first image variation value with the second critical value. If the first image variation value is greater than the second critical value, the process may be terminated. Otherwise, if the first image variation value is less than the second critical value, operation 703 will be performed.

At operation 703, the motion extraction module 411 may measure image variation values between respective adjacent frames from a specific previous frame (N-F) to the current frame (N) and then obtain the second image variation value by sampling the measured image variation values or calculating an average value thereof.

At operation 704, the condition comparison module 412 may compare the second image variation value with the second critical value. If the second image variation value is less than the second critical value, the process may be terminated. Otherwise, if the second image variation value is greater than the second critical value, operation 705 will be performed.

At operation 705, the feature point extraction and compression module 413 may extract an object feature from the current frame (N). Thereafter, at operation 706, the feature point extraction and compression module 413 may compress the extracted feature data. At this time, the processor 410 may transmit the extracted or compressed feature data to the server 206 by controlling the wireless communication unit 450.

Figure 8A:
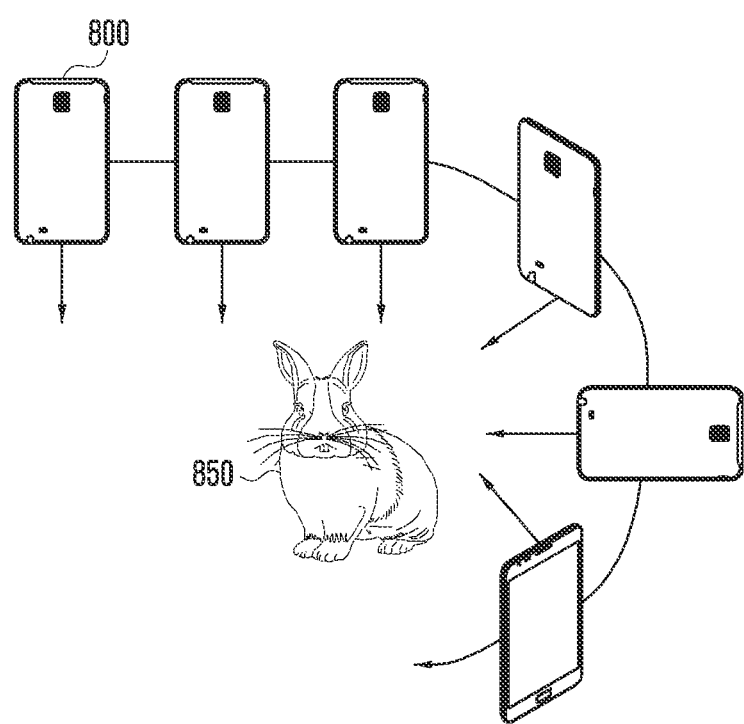
FIGS. 8A and 8B illustrate different cases of recognizing an object according to various embodiments of the present disclosure.
Figure 8B:
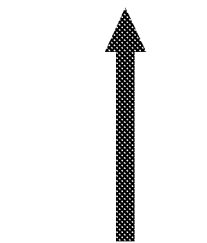
Figure 8B:
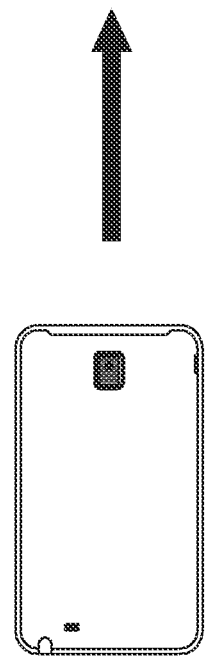
Figure 8B:
Figure 8B:
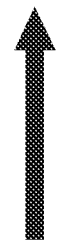
Figure 8B:
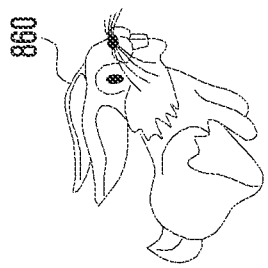
Figure 8B:
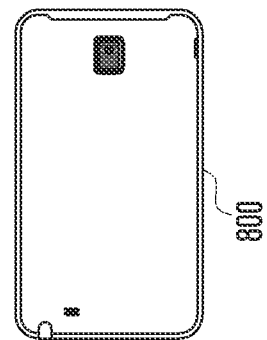

FIGS. 8A and 8B illustrate different cases of recognizing an object according to an embodiment of the present disclosure.

Referring to FIG. 8A, an electronic device 800 may move around an object 850. While the electronic device 800 is moved, the object 850 remains stationary. In this case, the above-discussed process of FIG. 6 may be used to measure a motion of the electronic device 800 and recognize the object 850.

Referring to FIG. 8B, the electronic device 800 may move along an object 860 which also moves. In this case, the above-discussed process of FIG. 5 may be used to measure motions of both the electronic device 800 and the object 860 and recognize the object 860.

Meanwhile, although not illustrated, in case an object is moved and an electronic device remains stationary, the above-discussed process of FIG. 7 may be used to directly measure a motion of the object and recognize the object.

Figure 9:
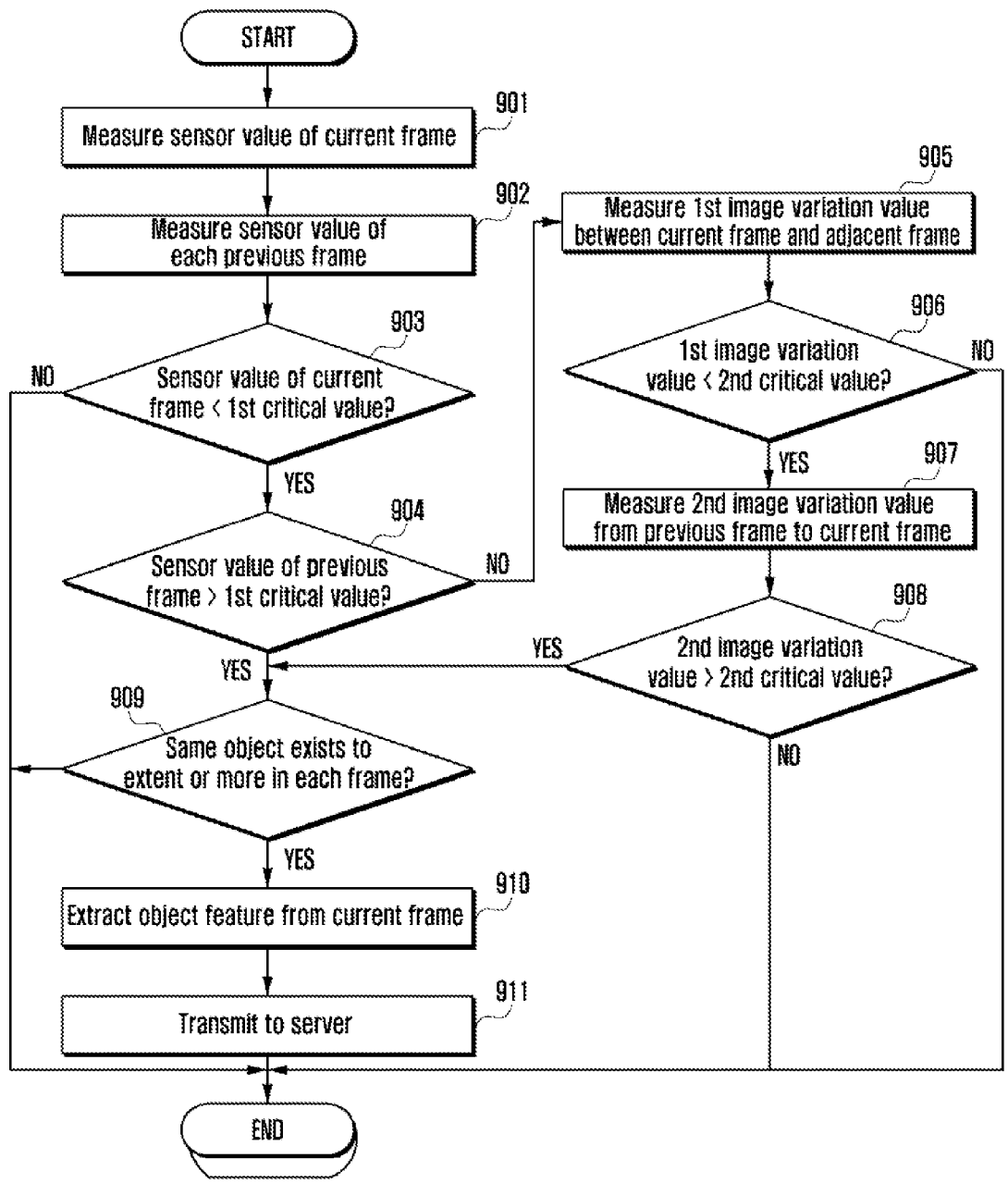
FIG. 9 is a flowchart illustrating a method for recognizing an object by determining whether there is a same object in continuous frames when motions of both an electronic device and the object are detected according to an embodiment of the present disclosure.

FIG. 9 is a flowchart illustrating a method for recognizing an object by determining whether there is a same object in continuous frames when motions of both an electronic device and the object are detected according to an embodiment of the present disclosure.

Referring to FIG. 9, at operation 901, the motion extraction module 411 may measure a motion of the electronic device in a current frame (N) by controlling the sensor unit 260. In addition, at operation 902, the motion extraction module 411 may measure a motion of the electronic device in each frame of at least one previous frame (N-F) before the current frame (N) by using the sensor unit 260. Measured results at operations 901 and 902 are obtained as sensor values. At this time, the motion extraction module 411 may obtain a single sensor value (hereinafter, referred to as a sampling value or an average value) by sampling the sensor values from a specific previous frame (N-F) to the current frame (N) or calculating an average value thereof.

At operation 903, the condition comparison module 412 may compare the measured sensor value of the current frame (N) with the first critical value. The first critical value may indicate a specific sensor value measured at a state when a motion of the electronic device is reduced remarkably for a close observation of an object during a motion for finding the object. If the measured sensor value of the current frame (N) is not less than the first critical value at operation 903, the condition comparison module 412 may terminate this process.

If the measured sensor value of the current frame (N) is less than the first critical value at operation 903, the condition comparison module 412 may perform operation 904.

At operation 904, the condition comparison module 412 may compare the sampling value or the average value with the first critical value. If the sampling value or the average value is greater than the first critical value, operation 909 will be performed. Otherwise, if the sampling value or the average value is less than the first critical value, operation 905 will be performed.

At operation 905, the motion extraction module 411 may detect a motion of the object by measuring an image variation value. Namely, the motion extraction module 411 may measure the first image variation value between the current frame (N) and the adjacent frame (N-1).

Additionally, at operation 906, the condition comparison module 412 may compare the first image variation value with the second critical value. If the first image variation value is greater than the second critical value, the process may be terminated. Otherwise, if the first image variation value is less than the second critical value, operation 907 will be performed.

At operation 907, the motion extraction module 411 may measure image variation values between respective adjacent frames from a specific previous frame (N-F) to the current frame (N) and then obtain the second image variation value by sampling the measured image variation values or calculating an average value thereof.

At operation 908, the condition comparison module 412 may compare the second image variation value with the second critical value. If the second image variation value is less than the second critical value, the process may be terminated. Otherwise, if the second image variation value is greater than the second critical value, operation 909 will be performed.

At operation 909, the processor 410 may determine whether the same object exists to a specific extent or more in each frame. If so, the processor 410 may extract features of the object from the current frame (N) at operation 910 and then transmit the extracted feature data to the server 206 at operation 911.

Figure 10:
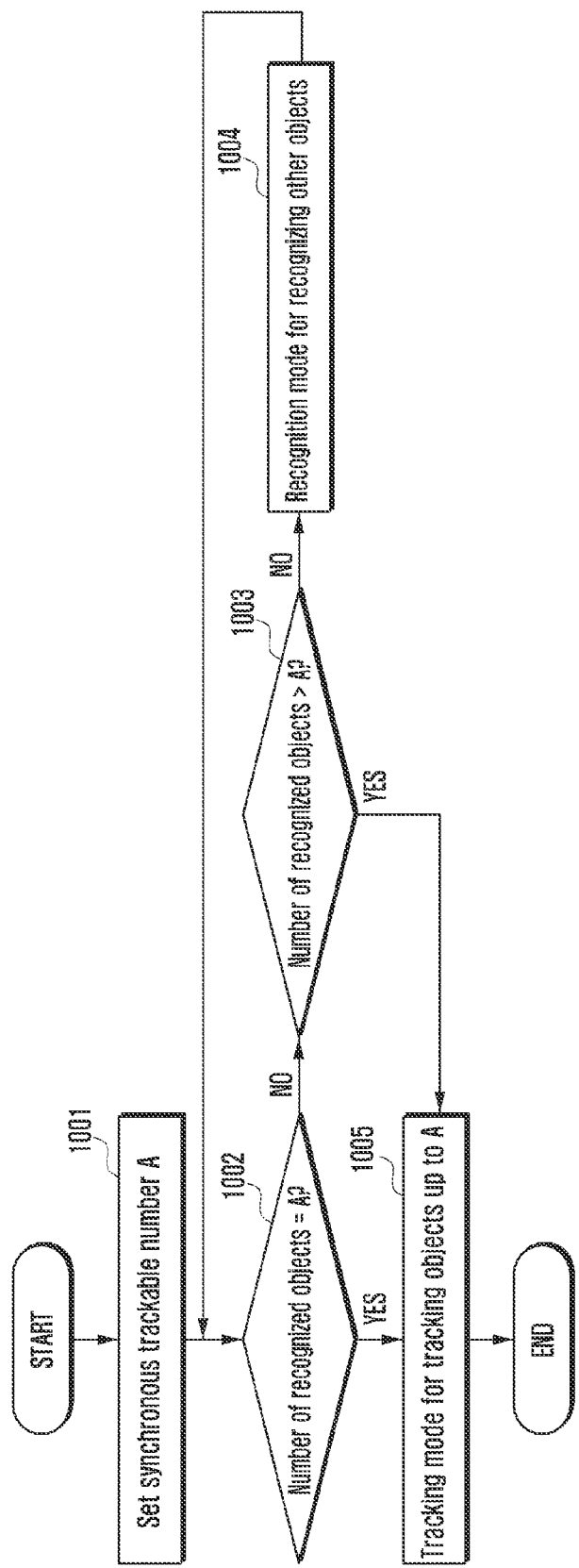
FIG. 10 is a flowchart illustrating a method for recognizing an object according to an embodiment of the present disclosure.

FIG. 10 is a flowchart illustrating a method for recognizing an object according to an embodiment of the present disclosure.

Referring to FIG. 10, at operation 1001, the processor 410 may set a synchronous trackable number (hereinafter, denoted by A) in response to a user's selection. For example, the synchronous trackable number A may be three.

At operation 1002, the processor 410 may recognize objects and determine whether the number of recognized objects is equal to the synchronous trackable number A, e.g., three. If the number of recognized objects is three which is set as the synchronous trackable number, the processor 410 may track just three objects without recognizing the other objects at operation 1005.

At operation 1003, the processor 410 may recognize objects and determine whether the number of recognized objects is greater than the synchronous trackable number A. If it is determined at operation 1003 that the number of recognized objects is greater than the synchronous trackable number, the processor 410 may perform operation 1005. Otherwise, if it is determined at operation 1003 that the number of recognized objects is less than the synchronous trackable number, the processor 410 may perform operation 1004.

At operation 1004, the processor 410 may not only track the recognized objects, but also execute the recognition mode to further recognize other objects until the objects are recognized up to the synchronous trackable number. Then the processor 410 may perform operation 1002 again.

Meanwhile, at operation 1005, the processor 410 may track three objects without transmitting a sensor value or image variation value to the server 206. As discussed above, this number of tracked objects corresponds to the synchronous trackable number A.

According to various embodiments of this disclosure, the image processing method may include sequentially receiving an image captured by the camera 421, determining whether a frame of the received image satisfies a predetermined condition, recognizing, if the predetermined condition is satisfied, an object in the frame, and tracking the object in the frame through tracking data created using a feature extracted from the recognized object.

According to an embodiment of the present disclosure, the determining of whether a frame of the received image satisfies a predetermined condition may include measuring sensor values of a current frame and one or more previous frames before the current frame, and determining whether the measured sensor values satisfy the predetermined condition. Here, the predetermined condition may be defined as a state when the sensor value greater than a critical value in the previous frames becomes less than the critical value in the current frame.

According to an embodiment of the present disclosure, the determining whether a frame of the received image satisfies a predetermined condition may include measuring image variation values between a current frame and an adjacent frame and between previous frames before the current frame, and determining whether the image variation values satisfy the predetermined condition. Here, the predetermined condition may be defined as a state when the image variation value greater than a critical value in the previous frames becomes less than the critical value in the current frame and the adjacent frame.

According to an embodiment of the present disclosure, the determining whether a frame of the received image satisfies a predetermined condition may include determining whether the frame satisfies the predetermined condition, and if the predetermined condition is satisfied, further determining whether the same object exists to a specific extent or more in each frame.

According to an embodiment of the present disclosure, the tracking of the object in the frame may include extracting the feature of the object, transmitting the extracted feature to a server, receiving the tracking data from the server, and tracking the object in the frame using the tracking data.

According to an embodiment of the present disclosure, the tracking of the object in the frame may further include determining, after extracting the feature of the object, whether a density value of the extracted feature is greater than a critical value. Here, the extracted feature may be transmitted to the server when the density value is greater than the critical value.

According to an embodiment of the present disclosure, the tracking of the object in the frame may be performed after calculating at least one of an initial location of the object and a posture of the object.

According to an embodiment of the present disclosure, the tracking of the object in the frame may include setting the synchronous trackable number of the objects, and comparing the number of the recognized objects with the synchronous trackable number. Here, if the number of the recognized objects is less than the synchronous trackable number, a recognition mode may be performed to further recognize other objects together with a tracking mode for tracking the recognized objects until the objects are recognized up to the synchronous trackable number.

According to an embodiment of the present disclosure, the tracking mode may include tracking the object in the frame received from the camera by using the tracking data received from a server. In addition, the recognition mode may include sequentially receiving the image captured by the camera, determining whether the frame of the received image satisfies the predetermined condition, recognizing the object in the frame when the predetermined conditions is satisfied, and tracking the object in the frame through the tracking data created using the feature extracted from the recognized object.

According to the above-discussed method and electronic device according to various embodiments of the present disclosure, it is possible to transmit to a server and track only the minimum data required for recognition by sampling in time and space an object in images continuously captured by a camera. In addition, it is possible to reduce a burden in image processing by directly processing an image captured by a camera.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The module or programming module of the present disclosure may include at least one of the aforementioned components with omission of some components or addition of other components. The operations of the modules, programming modules, or other components may be executed in series, in parallel, recursively, or heuristically. In addition, some operations may be executed in different order, omitted, or extended with other operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An image processing method comprising:
   determining, by a processor, whether a motion value corresponding to a current frame captured by a camera is less than a first motion value and a motion value corresponding to a previous frame captured by the camera is greater than the first motion value;
   determining, by the processor, if the motion value corresponding to the current frame is not less than the first motion value and the motion value corresponding to the previous frame is not greater than the first motion value, whether an image variation value related to the current frame is less than a first image variation value and an image variation value related to the previous frame is greater than the first image variation value;
   determining, by the processor, if the image variation value related to the current frame is less than the first image variation value and the image variation value related to the previous frame is greater than the first image variation value, whether at least one object exists in the current frame and in the previous frame;
   recognizing, by the processor, if the at least one object exists in the current frame and in the previous frame, a feature of the at least one object in the current frame; and
   tracking, by the processor, based on the feature, at least one object in subsequent frames sequentially captured by the camera.

2. The method of claim 1,
   wherein the determining of whether the image variation value related to the current frame is less than the first image variation value and the image variation value related to the previous frame is greater than the first image variation value comprises:
   measuring an image variation value between the current frame and the previous frame as the image variation value related to the current frame:
   measuring an image variation value between the current frame and other frames before the previous frame as the image variation value related to the previous frame;
   determining whether the image variation value related to the current frame is less than the first image variation value; and
   determining whether the image variation value related to the previous frame is the greater than the first image variation value.

3. The method of claim 1, wherein the tracking of the at least one object in the frames comprises:
   extracting at least one feature point of the at least one object;
   transmitting the at least one extracted feature point to a server;
   receiving tracking data corresponding to the at least one extracted feature point from the server; and
   tracking the at least one object in the frames based on the tracking data.

4. The method of claim 3,
   wherein the tracking of the at least one object in the frames comprises determining, after extracting the at least one feature point of the at least one object, whether a density value of the at least one extracted feature point is greater than a first density value, and
   wherein the at least one extracted feature point is transmitted to the server when the density value is greater than the first density value.

5. The method of claim 1, wherein the tracking of the at least one object in the frames is performed after calculating at least one of an initial location of the at least one object and a posture of the at least one object.

6. The method of claim 1,
   wherein the at least one object comprises a plurality of objects, wherein the tracking of the at least one object in the frame comprises:
   setting a synchronous trackable number for tracking the plurality of objects, and
   comparing a number of the plurality of objects with the synchronous trackable number, and
wherein, if the number of the plurality of objects is less than the synchronous trackable number, a recognition mode is performed to further recognize other objects together with a tracking mode for tracking the plurality of objects up to the synchronous trackable number.

7. The method of claim 6,
wherein the tracking mode comprises tracking the at least one object by using the tracking data received from a server, and
wherein the recognition mode comprises:
   determining whether the motion value corresponding to the current frame captured by the camera is less than the first motion value and the motion value corresponding to the previous frame captured by the camera is greater than the first motion value,
   recognizing the other objects, if the motion value corresponding to the current frame is less than the first motion value and the motion value corresponding to the previous frame is greater than the first motion value, and
   tracking the at least one object and the other objects in the subsequent frames through the tracking data.

8. An electronic device comprising:
a sensor configured to measure a motion of the electronic device;
an input device comprising a camera configured to receive frames of at least one object;
a memory configured to store data about the motion of the electronic device;
a display configured to display the frames;
a wireless communication device configured to communicate with a server; and
at least one processor configured to control the sensor, the input device, the memory, the display, and the wireless communication device,
wherein the at least one processor is further configured to:
   determine whether a motion value corresponding to a current frame captured by a camera is less than a first motion value and a motion value corresponding to a previous frame captured by the camera is greater than the first motion value;
   determine, if the motion value corresponding to the current frame is not less than a first motion value and the motion value corresponding to the previous frame is not greater than the first motion value, whether an image variation value related to the current frame is less than a first image variation value and an image variation value related to the previous frame is greater than the first image variation value;
   determine, if the image variation value related to the current frame is less than a first image variation value and the image variation value related to the previous frame is greater than the first image variation value, whether at least one object exists in the current frame and in the previous frame;
   recognize, if the at least one object exists in the current frame and in the previous frame, a feature of the at least one object in the current frame; and
   track, based on the feature, the at least one object in subsequent frames sequentially captured by the camera.

9. The electronic device of claim 8,
wherein, to determine whether an image variation value related to the current frame is less than a first image variation value and an image variation value related to the previous frame is greater than the first image variation value, the at least one processor is further configured to:
   measure an image variation value between the current frame and the previous frame as the image variation value related to the current frame:
   measure an image variation value between the current frame and other frames before the previous frame as the image variation value related to the previous frame; and
   determine whether the image variation value related to the current frame is less than the first image variation value; and
   determine whether the image variation value related to the previous frame is the greater than the first image variation value.

10. The electronic device of claim 8, wherein the at least one processor is further configured to:
   extract at least one feature point of the at least one object,
   transmit the at least one extracted feature point to the server through the wireless communication device,
   receive the tracking data corresponding to the at least one extracted feature point from the server through the wireless communication device, and
   track the at least one object in the current frames based on the tracking data.

11. The electronic device of claim 10,
wherein the at least one processor is further configured to determine, after extracting at least one feature point of the at least one object, whether a density value of the at least one extracted feature point is greater than a certain density value, and
wherein the at least one extracted feature point is transmitted to the server when the density value is greater than the certain density value.

12. The electronic device of claim 8, wherein the at least one processor is further configured to track the at least one object after calculating at least one of an initial location of the at least one object and a posture of the at least one object.

13. The electronic device of claim 8,
wherein the at least one object comprises a plurality of objects,
wherein the at least one processor is further configured to:
   set a synchronous trackable number for tracking the plurality of objects, and
   compare a number of the plurality of objects with the synchronous trackable number, and
wherein, if the number of the plurality of objects is less than the synchronous trackable number, the at least one processor is further configured to perform a recognition mode to further recognize other objects together with a tracking mode for tracking the plurality of objects up to the synchronous trackable number.

14. The electronic device of claim 13,
wherein the at least one processor is further configured to:
   track the at least one object in the frame received from the camera by using the tracking data received from a server, and wherein, when the at least one processor performs the recognition mode, the at least one processor is further configured to:
- determine whether the motion value corresponding to the current frame captured by the camera is less than the first motion value and the motion value corresponding to the previous frame captured by the camera is greater than the first motion value,
- recognize the other objects, if the motion value corresponding to the current frame is less than the first motion value and the motion value corresponding to the previous frame is greater than the first motion value, and
- track the at least one object and the other objects in the subsequent frames sequentially received from the camera through the tracking data.

15. At least one non-transitory computer-readable storage medium for storing a computer program of instructions configured to be readable by at least one processor for instructing the at least one processor to execute a computer process for performing the method of claim 1.

* * * * *